Patented June 24, 1941

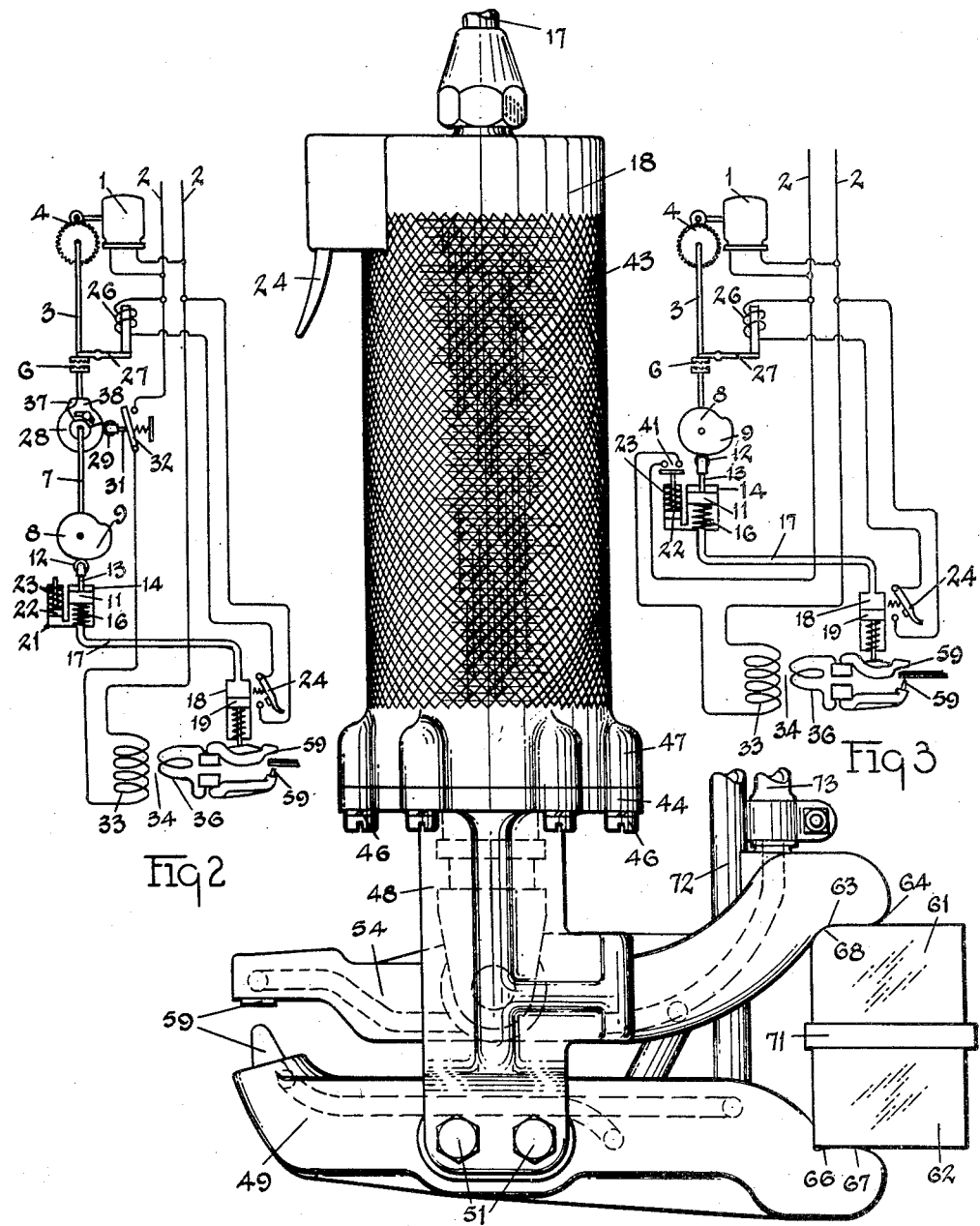

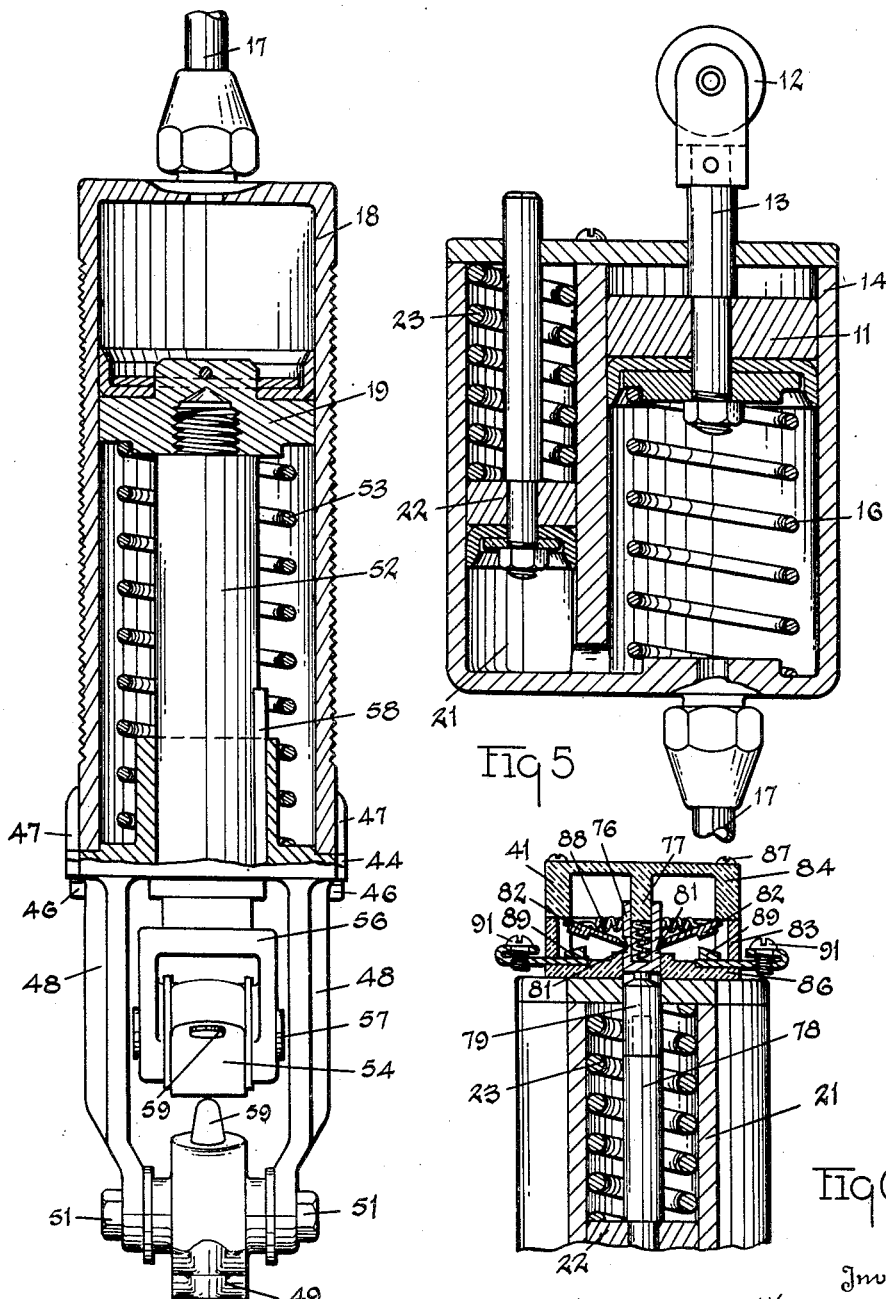

2,246,806

UNITED STATES PATENT OFFICE 2,246,806

WELDER

William H. Martin, Detroit, Mich.

Application May 8, 1936, Serial No. 78,675

14 Claims. (Cl. 219—4)

My invention relates to a hydraulically operated reciprocating tool, wherein a movable member is mechanically reciprocated and, by transmission of the power from the reciprocated member through a confined liquid, operates to reciprocate another member. The invention may be used to great advantage when applied to welders to eliminate hammering of welding points against the work. The welding points are formed of highly electric conductive metal that as a rule is relatively soft, and when used in pneumatically operated welders, the rapid pneumatic expansion upon initial introduction of the air into the operating cylinders causes the welding points to hammer against the work. Hammering the welding points rapidly "mushrooms" their ends and enlarges their contact areas. This operates to reduce the current quantity per unit of contact area that requires a longer contact period, produces burning, weakens the weld, and increases the labor of finishing or smoothing the point after the welding operation is completed.

The particular object of the invention is to provide a light weight portable welder wherein the pressure of the actuating means is transmitted through a confined liquid, preferably oil, of substantially fixed volume located intermediate a pair of reciprocable members, one of which is mechanically operated, and the other mechanically connected to the welding point for producing movement of the welding point according to the movement of the liquid, which eliminates hammering of the welding point against the work. The response of the welding point may be controlled by the frictional resistance to the flow of the oil, or the operation of the mechanical elements from which the power is hydraulically transmitted.

The invention also has for its object to provide a welder having a pivotally supported welder bar, the bar having parts for engaging the work, and an electrical conductor for connecting the work to a source of welding current, which eliminates unwieldy conductors that are commonly fixedly connected to the tool. The invention also has for its object to provide a hydraulic welding tool having a pair of welder bars connected to the cylinder and piston parts of the welding tool, one of which is pivotally connected to its associated part, the welder bars being operative to clamp the work and the electrical conductors between opposite end portions of the bars. The invention also provides a conductor or a pair of conductors remotely spaced from the work, the conductors being placed in parallel or contiguous relation, and the connection of the welder bar being such as to produce ample electric contact pressure against the conductors that is proportional to the welding pressure of the welding point against the work.

The invention also provides means for causing the flow of a welding current through the conductors, the bars, and the work by the pressure of the liquid through which the actuating power is transmitted to the portable tool when the welding and contact pressures reach a predetermined point. The invention also provides means for mechanically reciprocating a member for hydraulically actuating a liquid to transmit power to a piston of a portable welding tool, the mechanical means operating electrically to connect and disconnect a source of welding current with the work.

The invention consists in other features and advantages that will appear from the following description and upon examination of the drawings. To illustrate a practical application of the invention, I have selected a light-weight welder and a modified form of the welder as examples of the various structures that contain the invention. The particular structures selected may be modified in their details without departing from the spirit of the invention. The particular structures selected are shown in the accompanying drawings and are described hereinafter.

Fig. 1 illustrates a side view of a welding tool containing the invention. Fig. 2 illustrates a diagram of connections of parts of one form of the invention. Fig. 3 illustrates a diagrammatic connection of parts of another form of the invention. Fig. 4 illustrates a view of the section of the tool shown in Fig. 1. Fig. 5 illustrates a view of a section of a part of the apparatus, whose electric and hydrostatic connections are illustrated in Fig. 2. Fig. 6 illustrates a part of the apparatus embodying the form of the invention diagrammatically shown in Fig. 3.

The particular welding apparatus illustrated in the drawings may be used in connection with stationary or portable welders. Features of the apparatus may be used with considerable advantage where there is only a supply of electric current to produce a source of power, such as in welding steel or iron parts of houses and other buildings. An electric motor for operating the welder hydraulically may be connected to the commercial circuit, the power transmitting liquid being contained in the welder and the motor actuated means. The motor may also operate a small gear pump for circulating the water to cool the welding points, the water supply being conveyable and contained in a small reservoir.

If desired, the motor may be electrically controlled by a switch located on the welder. Also, if desired, a switch may be operated by the motor synchronously with the production of the maximum pressure produced by the motor in the hydraulically operated means to produce the flow of the welding current, or the flow of the welding current may be produced by the hydraulic pressure when the pressure reaches its maximum.

The hydraulic pressure means may be operated by an eccentric driven by the electric motor or may be operated by a cam driven by the motor to maintain the hydrostatic pressure at the welding pressure for a desired period and to produce the desired movement of the welding point to the work. Also, the switch that causes the flow of the welding current may be operated by a cam driven by the motor to initiate and terminate the flow of the welding current during the maintenance of the welding pressure to prevent flow of the welding current when there is a pressure less than the welding pressure. If desired, an adjustable cam may be used to produce initiation and termination of the flow of the welding current at desired points with respect to the period in which a high hydrostatic pressure is maintained.

The particular welding apparatuses selected as examples of the invention and shown in the drawings eliminate the use of air, which is commonly used for transmitting pressure, to eliminate the hammering and consequent heading of the welding points, and also provide means for connecting the source of welding current to the work through fixed conductor bars to eliminate the fixed connection of heavy welding current conduits to the welder. Thus, the welder is rendered exceedingly flexible, and easy to manipulate to produce accurate location of the welder in rapidly forming the succeeding welds, which makes the welder a truly hand portable tool.

As shown in Fig. 3, a suitable motor 1 may be connected to a commercial circuit having the lead lines 2. The motor may drive a suitable shaft 3 through a suitable reducing gear 4. A positive clutch 6 is located intermediate the shaft 3 and a shaft 7 for connecting at desired times the shaft 7 to the shaft 3. The shaft 7 has a suitable cam 8 having a cam surface 9 operative to engage a roller 12 and move a piston 11 connected to the roller 12 by the piston rod 13. The piston 11 is located in a cylinder 14. The piston 11 and the cam roller 12 are pressed against the surface of the cam by means of a spring 16 located intermediate the piston 11 and one end of the cylinder 14, the spring operating to return the piston when depressed by the cam.

The cylinder 14 is connected by a flexible, practically non-expansible tube 17 to a cylinder 18 having a piston 19. The space intermediate the pistons 11 and 19 within the connecting tube 17 and the cylinders being filled with oil, there will be produced a movement of the piston 19 that corresponds to the movement of the piston 11, the extent of movement being inversely proportional to the diameters of the cylinders and pistons.

The welding pressure and the volume of fluid may be maintained constant during the production of the welding pressure by means of a third cylinder 21 and a third piston 22 (Fig. 5), the piston 22 being spring pressed by a spring 23 located intermediate the piston 22 and one end of the cylinder 21. The cylinder 21 is smaller in diameter than the other cylinders, and the spring 23 has a yielding resistance that is, proportionate to the diameter of the piston, equal to the required welding pressure which forms a yielding cushion. The cylinder 21 may have a size to contain additional oil to supply oil to the spaces in the connected parts intermediate the pistons 11 and 19 by the pressure of the spring 23 if any of the oil should pass any one of the three pistons. The cylinder 21, the piston 22, and the spring 23 thus operate to maintain a welding pressure notwithstanding variation in the length of stroke of the welding points as they move to engage the work.

Preferably, the operation of the shaft 7 and its cam 8 is controlled by a switch 24 mounted on the portable welding parts, such as on the cylinder 18. The switch 24 is connected to the source of supply and to a solenoid 26 that, through a lever 27, operates to close the clutch 6 when the switch 24 is closed and to release the clutch when the switch 24 is opened. Thus, the switch 24 may be operated, when the portable welder is located in position to produce a weld, to cause the rotation of the cam 8 to produce the required welding pressure.

If desired, the flow of the welding current may be produced by means of the cam 28 that operates, by means of a suitable roller 29 and a plunger rod 31, a spring pressed switch 32 which connects the source of supply of electric current to the primary 33 of a transformer 34 having a secondary 36 for causing the flow of the welding current through parts of the welder and the work. If desired, the cam 28 may be provided with a pair of roller depressing parts 37 and 38 that may be adjustably mounted on the body of the cam 28 to adjust the period of the closure of the switch with reference to the length of the cam surface 9 that corresponds to the hydrostatic pressure period and thus produces the flow of the welding current for desired period lengths within, however, the periods of the pressure.

Since, during the pressure period, the piston 22 is displaced, the flow of the welding current may be controlled by a switch that may be operated by the piston 22, provided there is considerable free play intermediate the switch and the piston to insure a substantially constant volume of the liquid intermediate the pistons 11 and 19. In the form of the apparatus shown in Fig. 3, the cam 28 and the switch 32 is eliminated, and the electric connection from the main lines 2 to the primary 33 is made through the switch 41 to cause a welding current to be induced in the secondary 36. When, therefore, the switch 24, located on the portable welder, is operated to connect the cam 8 with the motor, and the actuating pressure is transmitted to the portable welder, the pressure of the liquid operates the piston 22 contra the pressure of the controlling spring 23 to produce closure of the switch 41 and cause the flow of the welding current. The switch is opened and the current flow is terminated immediately upon the termination of the welding pressure.

The switch 41 shown in detail in Fig. 6 has a sleeve 76 located on a stud or projection 77. The sleeve has considerable latitude of telescopic movement relative to the projection. The switch closes as the pressure rises and opens upon the return movement of the sleeve 76. The sleeve is engaged by the piston rod 78 or an extension 79 that may be placed upon the rod 78. The sleeve has a circular recess 81. The movable contacts 82 have circular edges that correspond to the radius of the recess 81. The ends of the contacts 82 move in slots 83 and are limited in their opening movements by the edge of a cap 84 that is secured to the shell 86 by the screws 87. The contacts 82 are connected together by means of the spring 88 to cause the contacts 82 to move toggle-wise to open and close the switch. A pair of fixed contacts 89 are secured to the base part of the shell 86 that may be located on the end of the cylinder 21, the contacts 89 having suitable binding posts or screws 91 for connecting the switch in the circuit of the primary 33 to cause the flow of the welding current through the welding bars, the welding point, and the work.

The cylinder 18 of the portable welder has an exterior cylindrical surface having a diameter sufficiently small to form a handle for the manipulation of the portable welder. If desired, the surface of the cylinder may be knurled, as at 43, to produce an efficient hand grip of the cylinder for manual manipulation of the welder. The switch is located at one end of the cylinder and in position convenient for operation by one of the fingers of the hand, such as the forefinger or the smaller finger, or if desired, with the thumb. This is usually dependent upon the relative location of the parts of the construction to be welded together and the convenience of manipulation of the welder. The head 44 of the welder is secured to the end of the cylinder 18 by means of screws 46, and by reason of the thinness of the wall of the cylinder bosses 47 are located on the wall and are tapped to receive the screws 46. The head 44 has cast integrally therewith the arms 48. A welder bar 49 is securely bolted to the lower ends of the arms 48 by the bolts 51. A piston rod 52 is connected to the piston 19, and a spring 53 is located intermediate the piston 19 and the head 44 for causing the return of the piston 19 upon cessation of the hydrostatic pressure that, in this instance, is produced by the operation of the cam 8. The axis of the piston and the piston rod is located preferably in the plane of the longitudinal center lines of the arms 48, and a welder bar 54 is pivotally connected to the outer end of the piston rod 52 by means of a bracket or stirrup 56 and the pivot pin 57, whose axis is preferably in the plane of the said center lines of the arms 48. This relative location is maintained by means of a suitable key, such as the key 58.

The welder bars are provided with suitable electrical, work engaging contacts or welder points 59 located in opposed relation in two of the ends of the bars. The welder points 59 may be formed according to the shape of the work in which the welds are to be formed. A pair of conductor bars 61 and 62 are disposed preferably along the line of the welds and are located substantially parallel or are shaped to correspond to the line of the welds to be formed on the work and are located in spaced relation therefrom, such that the ends of the welder bars may be moved along the conductor bars 61 and 62 to guide the welder as it is manually moved along the line of the welds. Thus end portions of the welder bars may move in contact with the conductor bars 61 and 62 the short distances between the welds when the welder points are separated from the work. The switch 24 may be operated to produce the welding and contact pressures to electrically connect the welder bars with the work and the conductor bars that are connected to the secondary 36 of the transformer 34.

The portable welder being manually held by the cylinder, there is ordinarily a rocking movement of the welder bars in making the contacts when the pressure is produced. Preferably the end portions of the welder bars are formed to have curved surfaces, such as the surfaces 63, 64, 66, and 67. If desired, the conductor bars 61 and 62 may also be provided with curved surfaces, such as the surface 68 on the conductor bar 61 that will coact to enable engagement of the welding points 59 with the work and the required electrical contact area to produce the minimum contact resistance intermediate the ends of the welder bars and the conductor bars. The curvature of the surfaces, such as the surfaces 63, 64, and 68, etc., of the ends of the welder bars and the conductor bars renders flexible variations between the line or lines along which the welds are formed and the linear shape of the conductor bars 61 and 62. Preferably the conductor bars 61 and 62 are formed to have a large cross-sectional area to maintain the resistance loss at a low point and also to locate ends of the welder bars that contact the conductor bars 61 and 62 as close together as is conducive to the required dimensions of the conductor bars. In view of the desirability of locating the conductor bars 61 and 62 in close proximity, they may be separated by a suitable insulating strip 71.

The welder points 59 may be cooled by means of water that may be directed from a suitable source to the pipes 72 and 73 and through the welder bars 49 and 54 and also to and through the welding points 59 in the manner well known in the art.

I claim:

1. In a hydraulically operated welder, a cylinder and a piston, means for mechanically reciprocating the piston, a second cylinder and piston, a flexible, substantially non-expansible tube interconnecting the said cylinders, a third cylinder and piston, a liquid located in the said cylinders and the tube, a spring for yieldingly resisting the movement of the said third piston, and movement of the liquid into the said third cylinder to produce the transmission of a required welding pressure from the first cylinder to the second cylinder and maintain a liquid supply of substantially a fixed quantity intermediate the said first and second pistons, a source of supply of welding current, a welding point operated by the pressure in the second cylinder to engage the work, and means for causing the flow of a welding current through the welding point and the work.

2. In a welder, a source of supply of a welding current, a pair of conductors connected to the said source, cylinder and piston parts, a pair of welder bars, one of the welder bars connected to one of the parts, and the other of the welder bars pivotally connected to the other of the parts and operative to clamp the conductors and the work, between opposite end parts of the bars, means for operating the piston part relative to the cylinder part, and means for producing flow of the welding current through the conductors, the welder bars, and the work.

3. In a portable welder, a cylinder, the exterior surface of the cylinder forming a hand hold for manipulating the welder, a trigger operated switch located at one end of the cylinder, a pair of electric conductor bars, a pair of welder bars, one of the welder bars connected to the cylinder, a piston, and a piston rod for operating the other of the bars, the said bars having end parts for clamping the conductor bars and the work, a source of welding current connected to the conductor bars, a fluid pressure means for operating the piston, and means controlled by the switch for causing the flow of a welding current through the conductor bars, welder bars, and the work.

4. In a welder, a cylinder, a piston, and a piston rod, a conductor bar, a welder bar pivotally connected to the piston rod and operative to engage the conductor bar and the work, the conductor bar and the welder bar having curved contacting surfaces for maintaining an electric contact area upon rocking movements of the welder bar, a source of supply of welding current connected to the conductor bar and to the work, a fluid pressure means for operating the piston, and means for directing the flow of the welding current through the conductor bar, the welder bar, and the work.

5. In a welder, a cylinder, piston, and a piston rod, a source of supply of a welding current, a pair of conductor bars insulatingly supported in contiguous relation to each other and extending along the line of the welds to be produced on the work and spaced from the work, a pair of welder bars, one connected to the cylinder and the other connected to the piston, for engaging the work and the conductor bars at opposite end portions of each of the bars, a fluid pressure means for operating the piston, and means for causing the flow of the welding current upon the production of the pressure against the work and the conductor bars by the piston.

6. In a welder, cylinder and piston parts, a pair of conductor bars, a welder bar pivotally connected to one of the parts, a second welder bar connected to the other of the parts, the welder bars operated by the cylinder and piston to clamp the conductor bars and the work between the end parts of the bars, the first named welder bar having a curved contacting surface for maintaining an electric contact area upon rocking movements of the said first named welder bar, a source of supply of welding current connected to the conductor bars.

7. In a hydraulically operated welder, a cylinder and a piston, means for reciprocating the piston, a second cylinder and piston, a flexible substantially non-expansible tube interconnecting the said cylinders, a third cylinder and piston, a liquid located in the said cylinders and the tube, a spring for yieldingly resisting the movement of the said third piston and the movement of the liquid into the said third cylinder to produce the transmission of the required welding pressure from the first-named cylinder to the said second cylinder, a source of supply of welding current, a welding point operated by the pressure in the said second cylinder to engage the work, and means for causing the flow of a welding current through the welding point and the work.

8. In a welder, a piston and a cylinder, a welding point operated by the pressure in the cylinder, a pressure device, a flexible pipe connecting the pressure device to the cylinder, the connected spaces between the pressure device and the piston containing liquid for hydraulically operating the piston to press the welding point against the work, a means for operating the pressure device, means for receiving liquid from the said spaces and means for yieldingly resisting the displacement of the liquid from the spaces by operation of the pressure device subsequent to the engagement of the work by the welding point and during the movement of the pressure device to maintain a predetermined welding pressure during the operation of the pressure device.

9. In a bar welding apparatus, a pair of conductors spaced from and extending along the work, a bridging tool comprising a frame having a cylinder, a pair of conductor members, each conductor member having one end part for engaging the work and another end part for engaging a conductor and for electrically bridging the said conductors and the work, a piston located in the cylinder and connected to one of the conductor members to press the work and the conductors by the conductor members when fluid under pressure is directed into the cylinder to connect the work to the conductors.

10. In a bar welding apparatus, a pair of conductors spaced from and extending along the work, a bridging tool comprising a frame having a cylinder, a pair of conductor members, each conductor member having one end part for engaging the work and another end part for engaging a conductor and for electrically bridging the said conductors and the work, the said one of the conductor members pivotally supported relative to the frame, a piston located in the cylinder and connected to one of the conductor members to press the work and the conductors by the conductor members when fluid under pressure is directed into the cylinder to connect the work to the conductors.

11. In a bar welding apparatus, a pair of adjacent conductors spaced from and extending along the work, a bridging tool movable along the conductors and the work, and comprising a frame having a cylinder, a pair of adjacent conductor members for engaging the said conductors and opposite sides of the work, one of the conductor members pivotally supported relative to the frame, a piston located in the cylinder, and connected to one of the conductor members to press the work and the conductors by the conductor members when fluid under pressure is directed into the cylinder to connect the work to the conductors.

12. In bar welding, a pair of closely adjacent current conductors, a bridging tool comprising a frame in which is located a handle forming a cylinder; a pair of contacts arranged to engage the work, one of said contacts being movable; and a piston reciprocating in said cylinder and having connections with the movable contact for pressing the contacts against the work and the conductors when fluid is turned into the fluid cylinder.

13. In bar welding, a pair of current conductors disposed closely adjacent and insulated from each other; a bridging tool comprising a frame in which is located a handle forming a cylinder; a contact arranged to engage one conductor; a work contact arranged to engage the work; and a piston reciprocating in the said cylinder, one of the contacts pivotally connected to the piston and forming a lever part for communicating the movement of the piston to the pivotal contact to press opposite end parts of the contacts upon the work and the conductors.

14. In bar welding, a pair of closely adjacent current conductors; a bridging tool comprising a frame in which is located a handle forming a cylinder; a movable lever contact arranged to engage one conductor and the work; a piston reciprocating in said cylinder and connected to the pivot point and intermediate the end parts of the movable contact; and a stationary work contact arranged to engage the other conductor and the work to press one end of each contact upon the work and the other end of each contact on a conductor by the pressure in the cylinder.

WILLIAM H. MARTIN.